United States Patent
Lee et al.

(10) Patent No.: US 7,929,080 B2
(45) Date of Patent: Apr. 19, 2011

(54) METHOD OF ADJUSTING PHOTONIC BANDGAP OF PHOTONIC CRYSTAL, METHOD OF MANUFACTURING REFLECTIVE COLOR FILTER USING THE SAME, AND DISPLAY DEVICE INCLUDING THE REFLECTIVE COLOR FILTER

(75) Inventors: Hong-seok Lee, Seongnam-si (KR); Byoung-ho Cheong, Seoul (KR); Jin-hwan Kim, Suwon-si (KR); Jae-ho You, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 639 days.

(21) Appl. No.: 11/940,586

(22) Filed: Nov. 15, 2007

(65) Prior Publication Data
US 2008/0309857 A1 Dec. 18, 2008

(30) Foreign Application Priority Data
Jun. 12, 2007 (KR) .................. 10-2007-0057300

(51) Int. Cl.
*G02F 1/1335* (2006.01)
(52) U.S. Cl. ............... 349/106; 349/114; 430/7
(58) Field of Classification Search ........... 349/106, 349/105, 108, 113, 114; 430/7, 321; 359/589, 359/590
See application file for complete search history.

(56) References Cited

U.S. PATENT DOCUMENTS

| | | | |
|---|---|---|---|
| 7,072,566 B2 * | 7/2006 | Seo et al. | 385/147 |
| 2003/0202728 A1 * | 10/2003 | Leonard et al. | 385/5 |
| 2003/0218704 A1 * | 11/2003 | Lee et al. | 349/106 |
| 2004/0227455 A1 * | 11/2004 | Moon et al. | 313/501 |
| 2004/0227874 A1 * | 11/2004 | Kim et al. | 349/106 |
| 2009/0323014 A1 * | 12/2009 | Cunningham et al. | 351/44 |

FOREIGN PATENT DOCUMENTS

| | | | |
|---|---|---|---|
| KR | 10-2005-0006428 A | | 1/2005 |
| WO | WO - 2004/099835 | * | 11/2004 |

* cited by examiner

*Primary Examiner* — Dung T Nguyen
*Assistant Examiner* — Tai Duong
(74) *Attorney, Agent, or Firm* — Sughrue Mion, PLLC

(57) ABSTRACT

Provided are a method of adjusting a photonic bandgap of a photonic crystal, a method of manufacturing a reflective color filter using the same, and a display device including the reflective color filter. The method of adjusting a photonic bandgap of a photonic crystal includes forming the photonic crystal having a photonic bandgap on a substrate, and changing the photonic bandgap by irradiating light onto the photonic crystal. In addition, the display device includes a backlight, a transflective liquid crystal panel including liquid crystal cells sealed between first and second substrates. Each liquid crystal cell corresponding to a pixel includes a transmissive area and a reflective area. A transmissive color filter is formed on the first substrate, which faces the backlight, and a reflective color filter is formed on each reflective area.

16 Claims, 10 Drawing Sheets

METHOD OF ADJUSTING PHOTONIC BANDGAP OF PHOTONIC CRYSTAL, METHOD OF MANUFACTURING REFLECTIVE COLOR FILTER USING THE SAME, AND DISPLAY DEVICE INCLUDING THE REFLECTIVE COLOR FILTER

CROSS-REFERENCE TO RELATED PATENT APPLICATION

This application claims priority from Korean Patent Application No. 10-2007-0057300, filed on Jun. 12, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to a method of adjusting a photonic bandgap of a photonic crystal, a method of manufacturing a reflective color filter using the same, and a display device including the reflective color filter.

2. Description of the Related Art

Photonic crystals have a lattice structure in which at least two materials having different refractive indexes are periodically arranged in a two-dimensional or three-dimensional structure. The photonic crystals having the lattice structure have a predetermined wavelength band at which incident light cannot pass in any direction due to the periodical distribution of refractive indexes, which is called a photonic bandgap.

For example, when the photonic bandgap of a photonic crystal is formed on a region of a visible ray, and the frequency of light incident onto the photonic crystal corresponds to the photonic bandgap, 99% or more of the incident light is theoretically reflected from the photonic crystal. On the other hand, the incident light having a frequency outside the photonic bandgap is almost entirely transmitted through the photonic crystal.

The three-dimensional reflective properties are useful for manufacturing reflective color filters for display devices. In this case, reflective cooler filters having different photonic bandgaps according to R, G, and B pixels can be manufactured.

A method of manufacturing a three-dimensional photonic crystal is classified as a top-down method, in which conventional lithography is used, or a self-assembly method, in which the physical or chemical combination of a colloid particle or a polymer is used. Particularly, in the self-assembly method, a substrate (e.g., glass or the like) is perpendicularly arranged in a colloid solution having an appropriate size, and a crystal structure, in which colloid spheres are packed to one another, is formed using evaporation of a solvent and a capillary force. Thus, this method is advantageous in that the three-dimensional photonic crystal can be formed to have a large area and the crystal structure is good.

However, since it is difficult to control the fine colloid particles, many processes could be processed in order to control the photonic bandgap by patterning the crystal structure according to regions.

For example, each region of a photonic crystal having different photonic bandgap is manufactured using colloid particles with different sizes and refractive indexes. To form other colloids, templates are formed and removed. This operation affects the crystal structure that has been already formed, and increases the design limit and complicates the process when the crystal structure is formed with two or more colloid particles by repeatedly using the same process.

To overcome the above problems, Korean Paten Application No. 2003-0046142 discloses a method of forming a photonic crystal structure on a desired selective region of a substrate by controlling a colloid using an electric force.

FIG. 1 is a view for explaining a method of manufacturing a photonic crystal structure, which is disclosed in Korean Paten Application No. 2003-0046142. Referring to FIG. 1, a first electrode layer 22, a second electrode layer 25, and an insulating layer 28 are coated on a substrate 10. The first and second electrode layers 22 and 25 have respectively a first polarity and a second polarity in response to a direct voltage supplied from a direct power source 32. The substrate 10 is immersed longitudinally in a container containing a colloid solution 50, and then the substrate 10 is removed upwardly from the container at a constant velocity. Thus, due to a surface tension and a capillary force, the colloid photonic crystal is formed only on a region corresponding to any one of the first and second electrode layers 22 and 25 according to the polarity of the colloid particles of the substrate 10.

In the above method, a colloid structure is patterned by controlling the fine colloid particles using colloid self-assembly and rather than a template, an electric force is used. Thus, the method is advantageous in that a photonic crystal structure having various shapes and sizes can be manufactured according to the electrode design. However, the above processes must be repeated in order to form the photonic crystal structure having various bandgaps. For example, to manufacture a reflective color filter, a transparent electrode is patterned per pixel. In addition, to form R, G, and B subpixels, the entire substrate must be always immersed in different colloid solutions to grow the photonic crystal.

SUMMARY OF THE INVENTION

Exemplary embodiments of the present invention provide a method of adjusting a photonic bandgap of a photonic crystal, a method of manufacturing a reflective color filter using the same, and a display device including the reflective color filter.

According to an exemplary aspect of the present invention, there is provided a method of adjusting a photonic bandgap of a photonic crystal, including: forming the photonic crystal having a photonic bandgap on a substrate; and changing the photonic bandgap by irradiating light onto the photonic crystal.

The forming may include: growing spherical colloid particles on the substrate using a colloid self assembly method; filling a space between the spherical colloid particles with a material having an effective refractive index which is changed by light; and removing the spherical colloid particles.

According to another aspect of the present invention, there is provided a method of manufacturing a reflective color filter, including: forming a photonic crystal having a first photonic bandgap corresponding to a first color on a transparent substrate, the photonic crystal having at least first, second, and third non-overlapping regions; adjusting a photonic bandgap of the second region from the first photonic bandgap to a second photonic bandgap corresponding to a second color by irradiating light onto the second region using a mask having an opening corresponding to the second region of the photonic crystal and covering the first and third regions of the photonic crystal; and adjusting a photonic bandgap of the third region from the first photonic bandgap to a third photonic bandgap corresponding to a third color by irradiating light onto the third region using a mask having an opening corresponding to the third region.

The forming may include forming the photonic crystal so that the first color is blue or green.

The forming may include: growing spherical colloid particles on the substrate using a colloid self assembly; filling a space between the spherical colloid particles with a material having an effective refractive index which is changed by light; and removing the spherical colloid particles.

According to another aspect of the present invention, there is provided a transflective liquid crystal display device including: a backlight; a transflective liquid crystal panel including a liquid crystal cell sealed between first and second substrates, wherein each liquid crystal cell corresponding to a pixel includes a transmissive area and a reflective area; a transmissive color filter formed on the first substrate which faces the backlight; and a reflective color filter formed on each reflective area.

The reflective color filter may be manufactured using a method according to an embodiment of the present invention.

BRIEF DESCRIPTION OF THE DRAWINGS

The above and other exemplary aspects and advantages of the present invention will become more apparent by the following detailed description of exemplary embodiments thereof with reference to the attached drawings in which.

DETAILED DESCRIPTION OF EXEMPLARY EMBODIMENTS OF THE INVENTION

Hereinafter, exemplary embodiments of the invention will be described in detail with reference to the attached drawings.

FIGS. 2A through 2E are views illustrating a method of adjusting photonic bandgap of a photonic crystal, according to an embodiment of the present invention.

Figure 1:
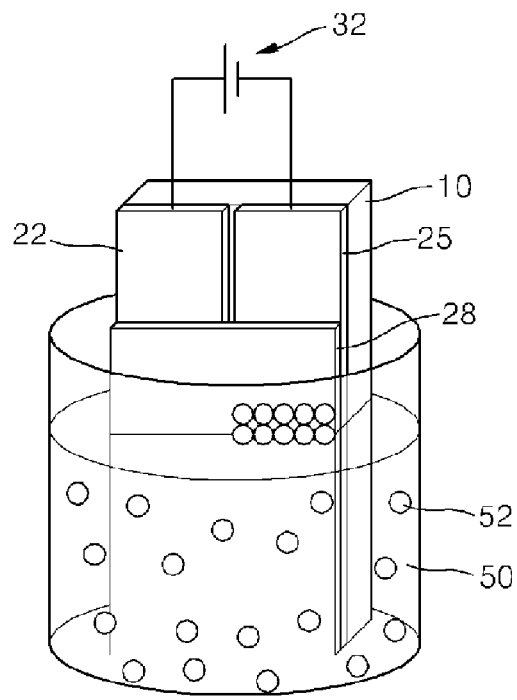
FIG. 1 is a view illustrating a method of manufacturing a photonic crystal structure, which is disclosed in Korean Paten Application No. 2003-0046142.
Figure 2A:
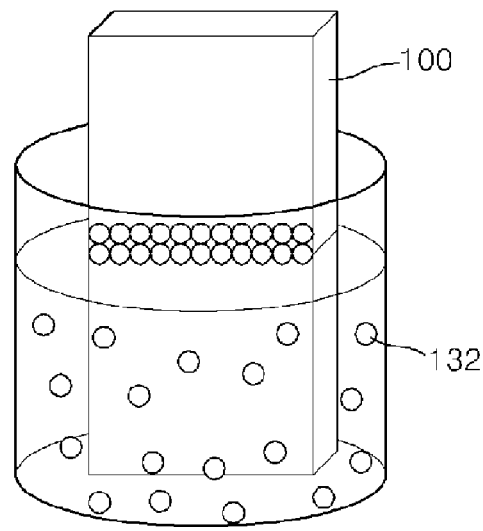
FIGS. 2A through 2E are views illustrating a method of adjusting a photonic bandgap of a photonic crystal, according to an exemplary embodiment of the present invention.

Referring to FIG. 2A, colloid particles 132 are formed on a substrate using a colloid self assembly method. That is, the substrate 100 is immersed in a water solution including the colloid particles 132 and is removed upwardly and perpendicularly from the water solution. Then, the colloid particles 132, which have spherical shape, are closely packed to the substrate 100 due to a surface tension and a capillary force. The colloid particles 132 may be formed of a material of which effective refractive index is changed according to the dosage and the exposure time of infrared rays or visible rays. For example, the colloid particles 132 may be formed of a photopolymer. The colloid particles 132 may be formed of a material in which phase transition occurs due to heat. For example, the colloid particles 132 may be formed of a phase change material and a chalcogenide-based material that are used in optical disks. In addition, a material of which effective refractive index is changed by the generation of nano pores generated by heat may be used. The material may be a pore generating material (porogen) of which permittivity is reduced by the nano pores generated by heat, thereby changing the effective refractive index. Porogen can be classified into various types of materials, but can be simply classified as a dendrimer-type polymer, a branch-type polymer or a decomposable polymer. The dendrimer-type polymer includes a polymer constituting a dendrimer-type structure including a ring-opening polymerization unit (e.g., caprolactone, valeractone or the like) therein, and a polymer constituting a dendrimer-type structure including alkylene oxide group of C1-C10 (e.g., ethylene oxide and propylene oxides) therein. The branch-type polymer includes a polymer formed by additionally reacting of an olygomer and a polymer to a side chain having a reactive group constituting a backbone. The decomposable linear polymer includes polyester, polystyrene, polymethyl styrene (PMS), polyacrylate, polymethacrylate (PMA), polycarbonate, polyether or polyalkylene oxides. A general decomposable single-molecule includes cyclodextrins. In addition to the above-exemplified materials, any material, the effective refractive index of which is changed by nano pores generated by heat, can be used in forming the colloid particles 132. A structure constituting the colloid particles 132 may be a sphere including a single material, or alternatively a core-shell structure including two different materials. In the case of the core-shell structure, a material, in which the effective refractive index of a core or a shell is changed, may be used in forming the colloid particles 132.

Figure 2B:
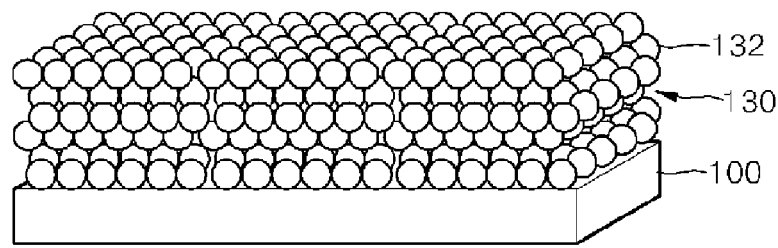

Referring to FIG. 2B, the colloid particles 132, which are formed to be packed closely to each other on the substrate 100, and air filled between the colloid particles 132 are arranged such that materials having different refractive indexes may three-dimensionally intersect one another. That is, according to the above structure, a photonic crystal 130 having a predetermined photonic bandgap is formed. The photonic bandgap is a wavelength band at which incident light cannot pass in any direction to thereby increase reflectivity of light. The wavelength band is determined according to the materials or the size of the colloid particles 132. For example, when the refractive index of the material of the colloid particles 132 is n1, and the refractive index of air is n2, the photonic bandgap of the photonic crystal 130 constituting the structure, in which materials having a refractive index of n1/n2 are three-dimensionally intersecting one another, is $\Delta\lambda_1$.

Figure 2C:
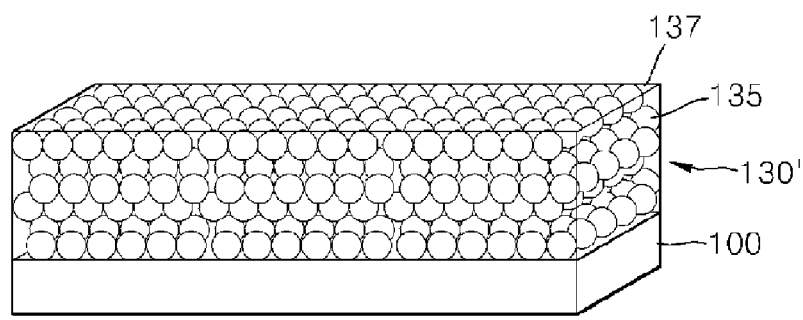

FIG. 2C is a view illustrating a photonic crystal 130' according to another embodiment of the present invention. That is, the space between the colloid particles 132 illustrated in FIG. 2B is filled with a material 137, the effective refractive index of which is changed by light. The material 137 may be a photopolymer, a chalcogenide-based material, a porogen or the like. Next, when the colloid particles 132 are removed, the photonic crystal 130' constituting a structure in which an air region 135 having a spherical shape and the material 137 are three-dimensionally arranged across one another is formed. Hereinafter, the photonic crystal 130 illustrated in FIG. 2B will be described. However, the photonic crystal 130' illustrated in FIG. 2C can be used in the method of adjusting a photonic bandgap, according to the current embodiment of the present invention.

Figure 2D:
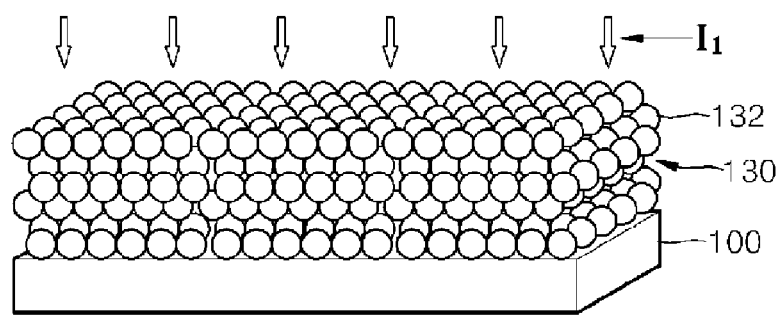

Referring to FIG. 2D, the photonic bandgap of the photonic crystal 130 is changed by irradiating light $I_1$ onto the photonic crystal 130. The light $I_1$ may be infrared rays or visible rays. When the material of the colloid particles 132 is a photopolymer, the effective refractive index of which is changed according to the exposure time or the dosage of light, the effective refractive index of the colloid particles 132 is changed by the light $I_1$. That is, since a refractive index arrangement of n1/n2, by which the photonic bandgap of the photonic crystal 130 is determined, is changed to n1'/n2, the photonic bandgap of the photonic crystal 130 is also changed to $\Delta\lambda_1'$.

Figure 2E:
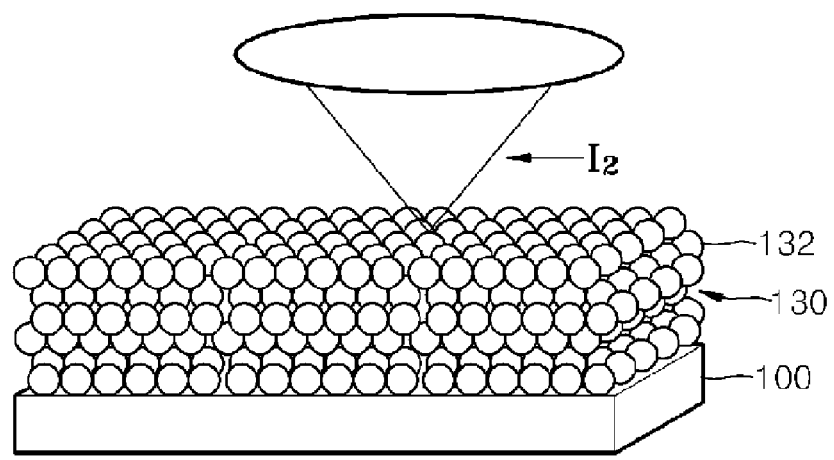

FIG. 2E is a view illustrating a method of adjusting a photonic bandgap in the case where the phase of the material of the colloid particles 132 is changed by heat. A laser beam or focused light $I_2$ is irradiated onto the photonic crystal 130. That is, the effective refractive index of the colloid particles 132 is changed by irradiating light having a large output to apply heat to one point of the photonic crystal 130 and then scanning the light. The change of the effective refractive index is adjusted according to the scan time or the output of a light source. When the refractive index of the colloid particles 132 is changed to n1", since a refractive index arrangement of n1/n2, by which the photonic bandgap is determined, is changed to n1"/n2, the photonic bandgap of the photonic crystal 130 is changed to $\Delta\lambda_1"$.

The case where the photonic bandgap of an entire region of the photonic crystal 130 is changed is just an example, and the photonic bandgap of a part of a region may be adjusted when a mask is used so that light may be incident only on the part of the region. When a mask is used, an insulating barrier rib may be formed on an interface between one part of the region and another part of the region so that an optical energy incident on the first part of the region may not be transferred to the second part of the region. Hereinafter, the above embodiments will be described in a method of manufacturing a reflective color filter.

FIGS. 3A through 3E are views illustrating a method of manufacturing a reflective color filter, according to an embodiment of the present invention.

The reflective color filter includes a first subpixel, a second subpixel and a third subpixel. Of the incident light, the subpixels reflects light of a predetermined wavelength band corresponding to each subpixel, thus, colors are realized. Hereinafter, the first through third subpixels will be respectively described as regions having photonic bandgaps corresponding to red R, green G, and blue B pixels.

Figure 3A:
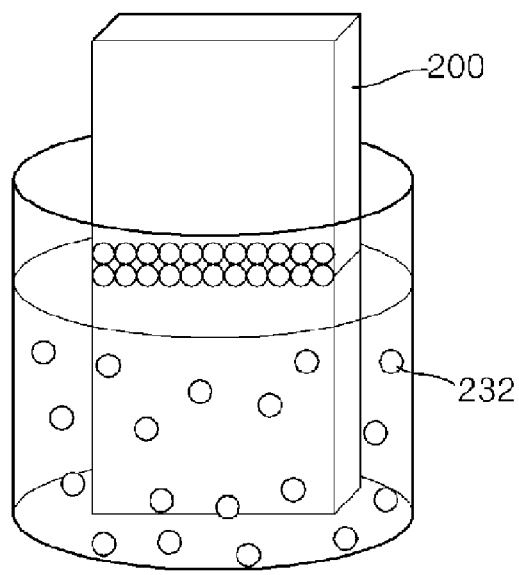
FIGS. 3A through 3E are views illustrating a method of manufacturing the reflective color filter, according to an exemplary embodiment of the present invention.

Referring to FIG. 3A, colloid particles 232 are formed on a transparent substrate 200 using a colloid self-assembly method. That is, the transparent substrate 200 is immersed in a water solution including the colloid particles 232 and removed upwardly and perpendicularly from the water solution. Then, the colloid particles 232 are closely packed to the transparent substrate 200. The colloid particles 232 may be formed of a material of which the effective refractive index is changed by light. For example, a photopolymer can be used, the effective refractive index of which is changed according to a dosage and an exposure time of infrared rays or visible rays.

Figure 3B:
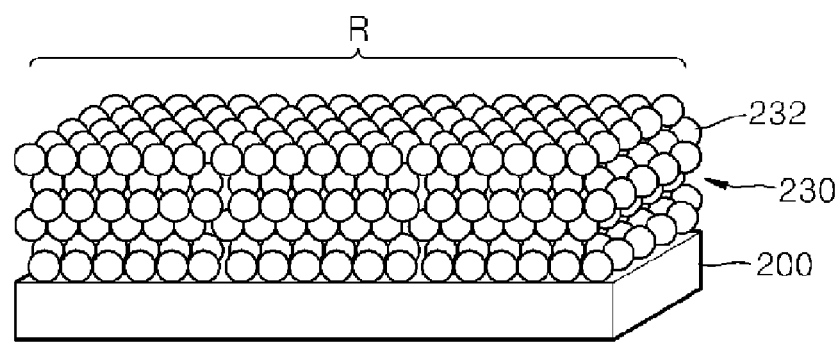

Referring to FIG. 3B, the photonic bandgap is formed according to a structure of the photonic crystal 230, in which the colloid particles 232 and air filled the colloid particles 232 are distributed across one another. For example, the photonic bandgap may be a red light band by appropriately selecting the size and the material of the colloid particles 232. A region of the photonic crystal 230 having the photonic bandgap of a red light wavelength is denoted by R.

Figure 3C:
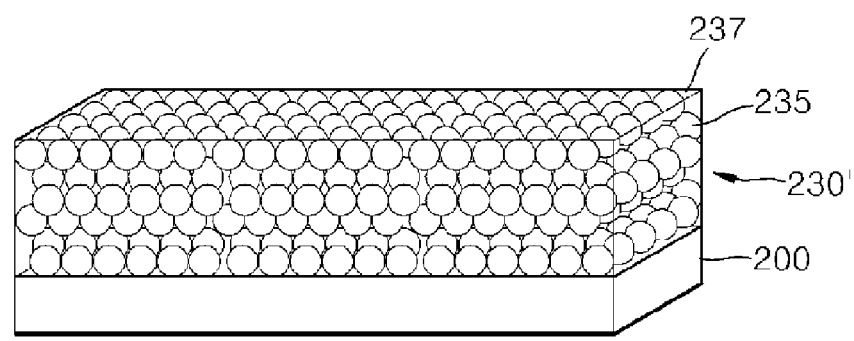

FIG. 3C is a view illustrating a photonic crystal 230' according to another embodiment of the present invention. That is, the space between the colloid particles 232 illustrated in FIG. 3B is filled with a material 237 of which the effective refractive index is changed by light. The material 237 may be a photopolymer, the effective refractive index of which is changed according to a dosage or an exposure time of the infrared rays or the dosage of light. Next, when the colloid particles 232 are removed, the photonic crystal 230' constituting a structure in which an air region 235 having a spherical shape and the material 237 are three-dimensionally arranged across one another is formed. Hereinafter, the photonic crystal 230' illustrated in FIG. 3B will be described. However, the photonic crystal 230' illustrated in FIG. 3C can be used in the method of adjusting a photonic bandgap, according to the current embodiment of the present invention.

Figure 3D:
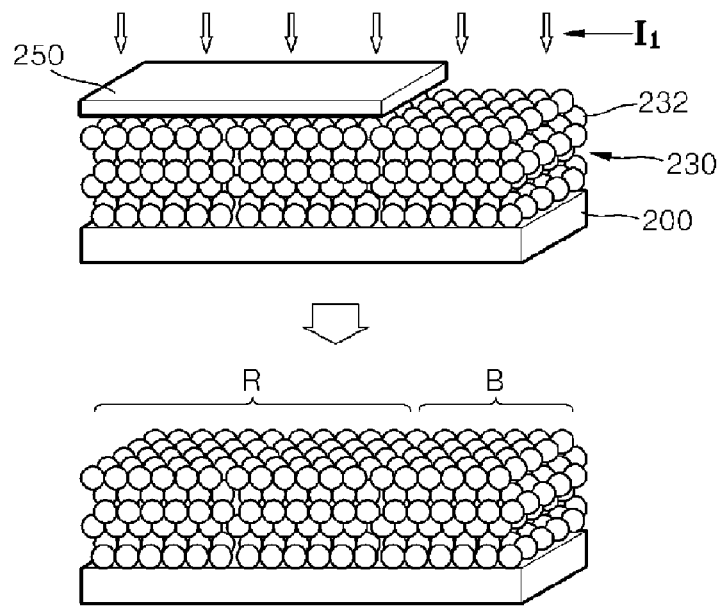

Referring to FIG. 3D, light $I_1$ is irradiated onto the photonic crystal 230 using a mask 250. The mask 250 has an opening corresponding to a region to be formed as a B subpixel, for example. The light $I_1$ may be infrared rays or visible rays. The photonic bandgap of the region is changed to a blue light band by appropriately adjusting the exposure time or the dosage of the light $I_1$.

Figure 3E:
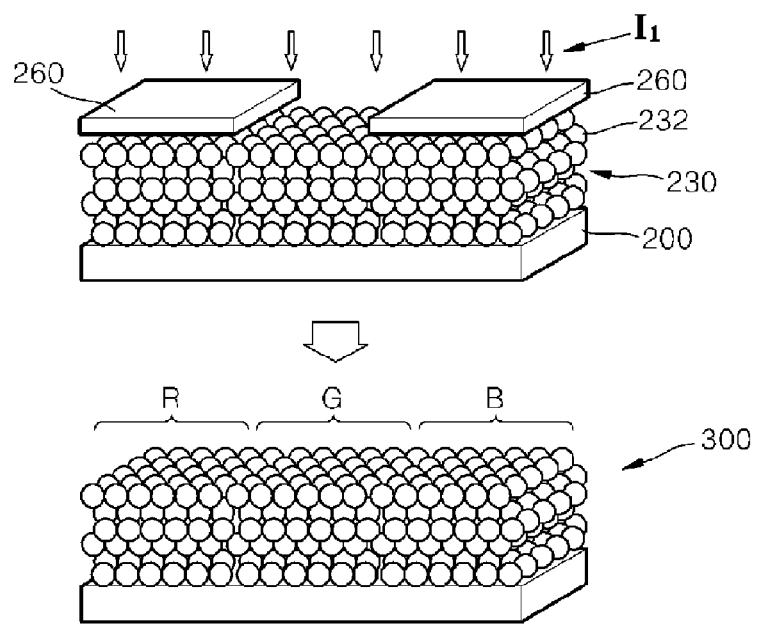

Referring to FIG. 3E, the light $I_1$ is irradiated using a mask 260 having an opening corresponding to a region to be formed as a G subpixel. The exposure time and the dosage of the light $I_1$ are adjusted so that the photonic bandgap of the region may be a green light band. At this time, the mask 260 may be the same as the mask 250 having the opening corresponding to the region to be formed as the B subpixel. That is, since general reflective color filters have a structure in which R, G, and B subpixels are alternately arranged, a method in which a mask having an opening corresponding to a region to be formed as one kind of subpixel is moved by an interval between adjacent ones of subpixels according to a predetermined operation can be used.

A reflective color filter 300 including R, G, and B subpixels formed thereon is thereby manufactured through the above operations.

Figure 4A:
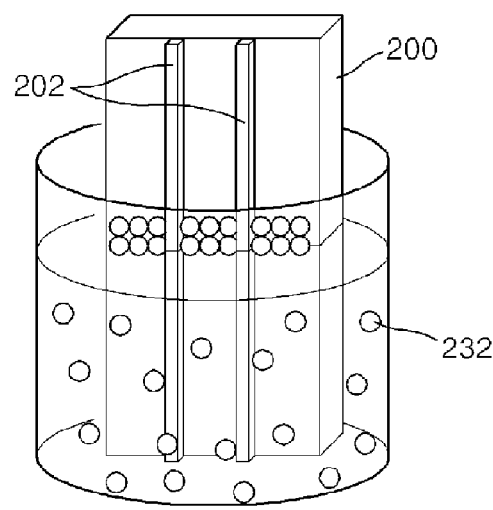
FIGS. 4A through 6B are views illustrating a method of manufacturing a reflective color filter, according to exemplary embodiments of the present invention.
Figure 4B:
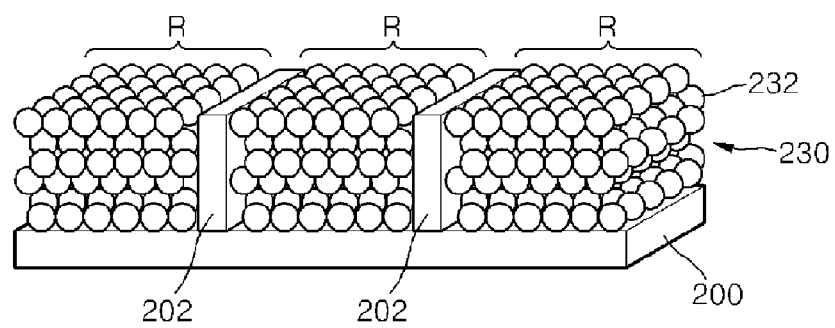
Figure 4C:
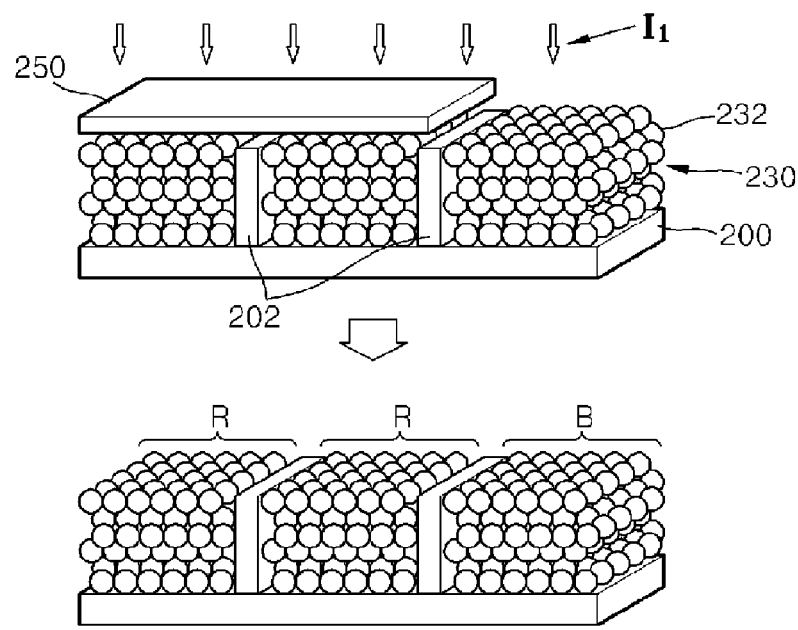
Figure 4D:
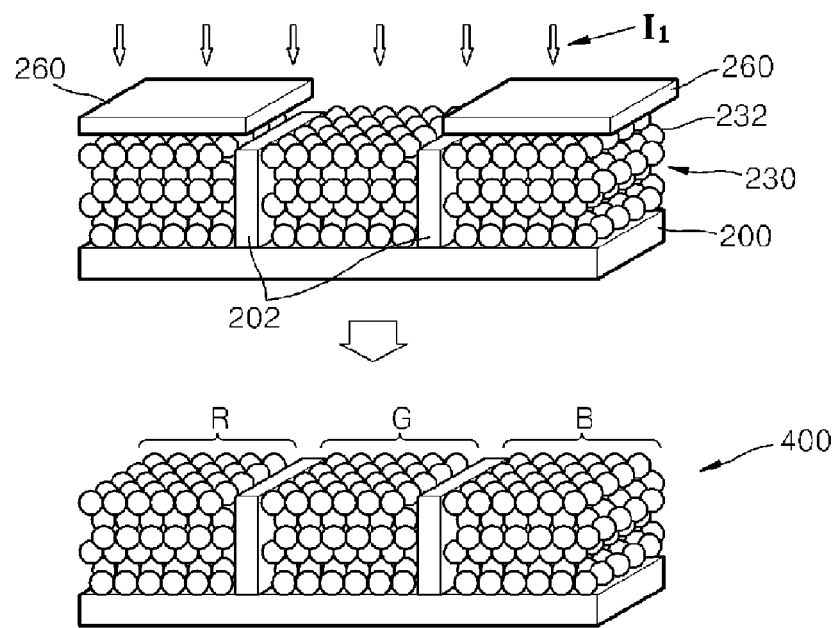

FIGS. 4A through 4D are views illustrating a method of manufacturing a reflective color filter, according to another embodiment of the present invention. Referring to FIG. 4A, insulating barrier ribs 202 are formed on a transparent substrate 200. The insulating barrier ribs 202 are formed in order to definitely form an interface between subpixels (i.e. an interface between regions which will have different photonic bandgaps from each other). The number and the shape of the barrier ribs 202 are appropriately adjusted. The transparent substrate 200 is immersed in a water solution including colloid particles 232 and is removed upwardly and perpendicularly from the water solution. Then, a photonic crystal 230 is formed as illustrated in FIG. 4B. At this time, the photonic crystal 230' illustrated in FIG. 3C may be formed. Referring to FIG. 4C, a B subpixel is formed using a mask 250 having an opening corresponding to a region to be formed as the B subpixel. Then, referring to FIG. 4D, a G subpixel is formed using a mask 260 having an opening corresponding to a region to be formed as the G subpixel. At this time, the insulating barrier ribs 202 formed on the interface between subpixels prevents a thermal energy from being transferred to adjacent regions when light is irradiated. Accordingly, the interface between subpixels is definitely formed.

Figure 5A:
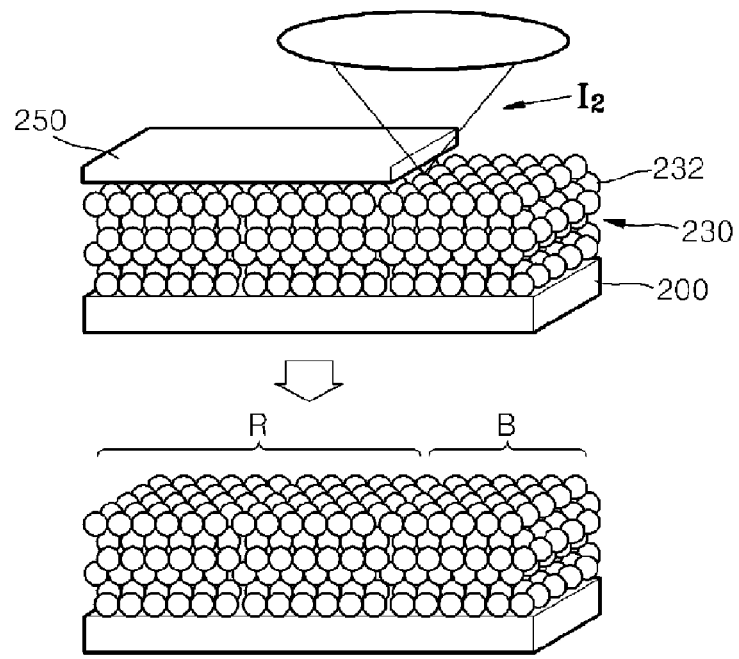
Figure 5B:
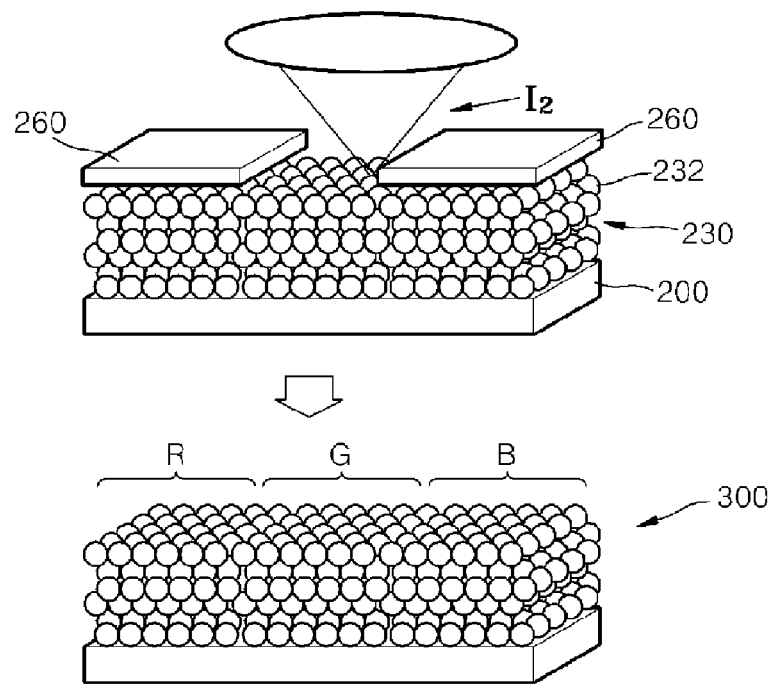

FIGS. 5A and 5B are views illustrating a method of manufacturing a reflective color filter 300, according to another embodiment of the present invention. The method of FIGS. 5A and 5B is the same as the method of FIGS. 3A through 3E except that colloid particles 232 are formed of a material in which a phase transition occurs due to heat (e.g., a chalcogenide-based material) or a material in which nano pores are generated by heat (e.g., progen), and a laser beam having a large output or focused light $I_2$ is used. That is, as illustrated in FIGS. 3B and 3C, a photonic crystal 230 is formed, and the light I₂ is irradiated using a mask 250 having an opening corresponding to a region to be formed as a B subpixel. A photonic bandgap having a blue light wavelength band is formed by adjusting the scan time or the output. Next, the light I₂ is irradiated using a mask 260 having an opening corresponding to a region to be formed as a G subpixel. A photonic bandgap having a green light wavelength band is formed by adjusting the scan time or the output.

Figure 6A:
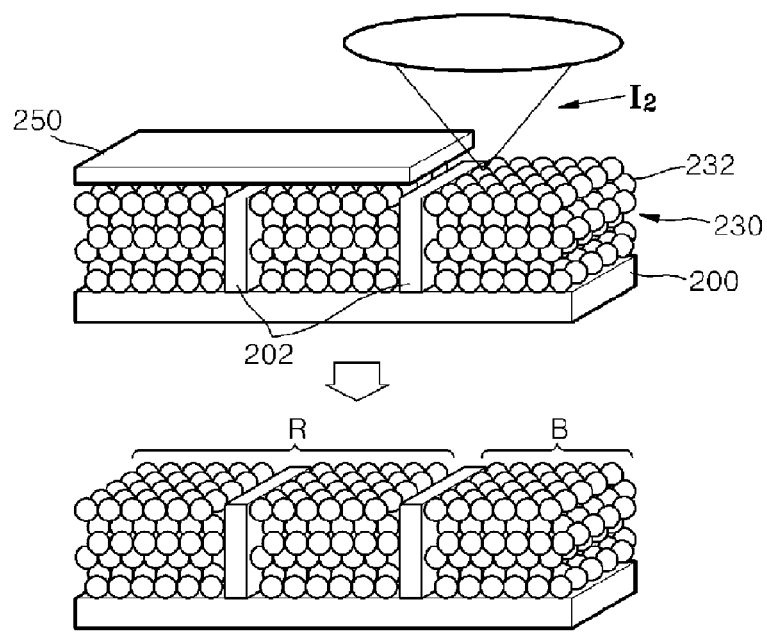
Figure 6B:
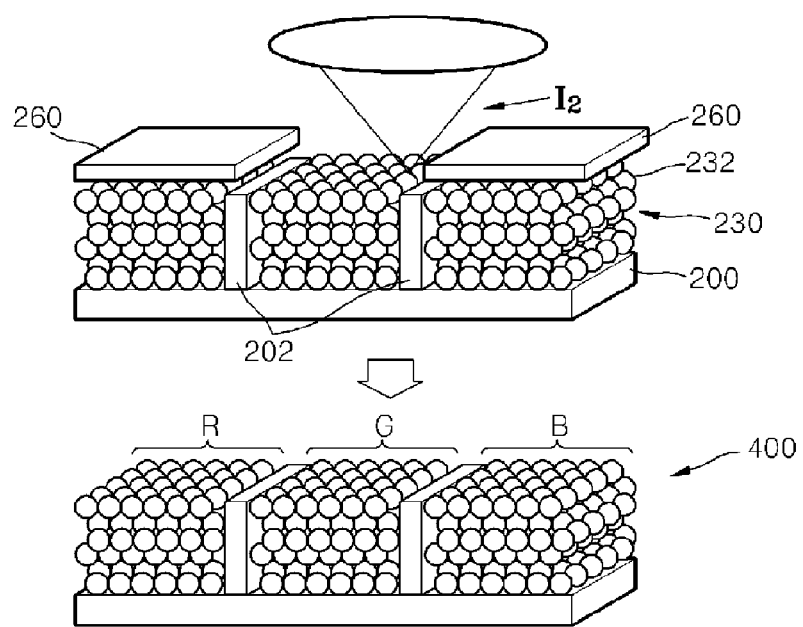

FIGS. 6A and 6B are views illustrating a method of manufacturing a reflective color filter 400, according to another embodiment of the present invention. The method of FIGS. 6A and 6B is the same as the method of FIGS. 5A and 5B except that insulating barrier ribs 202 constituting an interface between subpixels (i.e. an interface between regions having different photonic bandgaps) are formed on a transparent substrate 200. Since the insulating barrier ribs 202 prevent thermal energy from being transferred to regions having different photonic bandgaps when light I₂ is irradiated, the reflective color filter 400 having a definite interface between subpixels can be manufactured using the insulating barrier ribs 202.

In the above embodiments of the present invention, a photonic crystal having a photonic bandgap of a red light wavelength band is first formed, and then the photonic bandgaps of blue light and green light wavelength bands are sequentially adjusted. However, this is only an example, and the photonic bandgaps can be formed in another order. For example, a photonic crystal having a photonic bandgap of a blue light wavelength band is first formed, and then photonic bandgaps of different wavelength bands may be adjusted according to regions of subpixels.

Figure 7:
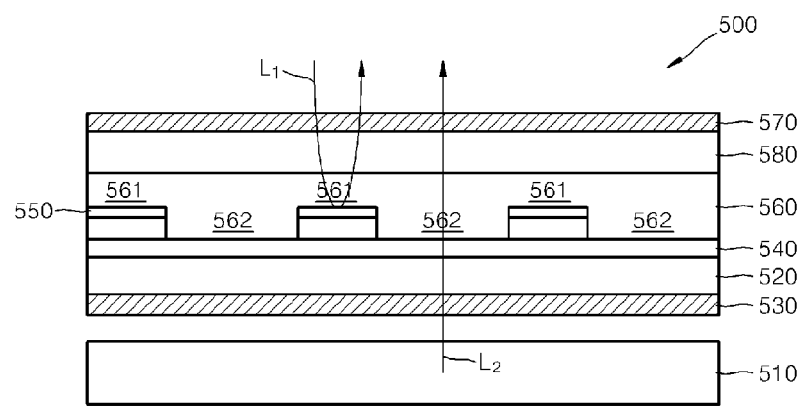
FIG. 7 is a schematic view illustrating a transflective liquid crystal display device according to an exemplary embodiment of the present invention.

FIG. 7 is a schematic view illustrating a transflective liquid crystal display device 500 according to an embodiment of the present invention. Referring to FIG. 7, the transflective liquid crystal display device 500 includes a backlight 510 and a transflective liquid crystal panel. The transflective liquid crystal panel includes a liquid crystal cell 560 sealed between two substrates 520 and 580. First and second polarizers 530 and 570 are respectively disposed on the substrates 520 and 580. Polarizing axes of the first and second polarizers 530 and 570 may have the same direction or perpendicular directions to each other according to the liquid crystal mode of the liquid crystal cell 560. A transmissive color filter 540 is disposed on the substrate 520 facing a backlight 510. R, G, and B subpixels, which are formed on the transmissive color filter 540, respectively transmit light having a wavelength band corresponding to each subpixel and absorb other light to realize colors. In addition, a pixel electrode and a thin film transistor (TFT), which drive each pixel, may be formed on the liquid crystal panel, but are not shown in FIG. 7. The liquid crystal cell 560 corresponding to each pixel includes a reflective area 561 and a transmissive area 562. A reflective color filter 550 is disposed on the reflective area 561. R, G, and B subpixels, which are formed on the reflective color filter 550, respectively reflect light having wavelength band corresponding to each subpixel and transmit other light to realize colors. Reflective color filters 300 and 400, which are manufactured using the methods of manufacturing the reflective color filter illustrated in FIGS. 3A through 6B, may be used as the reflective color filter 550.

The transflective liquid crystal display device 500 having the above structure is operated as follows. Light L2 of the backlight 510 passes through the transmissive area 562 to form an image. That is, the light L2 of the backlight 510 is incident on the transmissive color filter 540, and then light having a wavelength band corresponding to each subpixel is transmitted and other light is absorbed to realize colors. The color light is switched on and off according to the electrical control of the liquid crystal cell 560 to form an image. External light L1 is reflected on the reflective area 561 to form an image. That is, when the external light L1 is incident on the reflective color filter 550, light having a wavelength band corresponding to each subpixel is reflected and other light is transmitted to realize colors. The color light is switched on and off according to the electrical control of the liquid crystal cell 560 to form an image.

Figure 8:
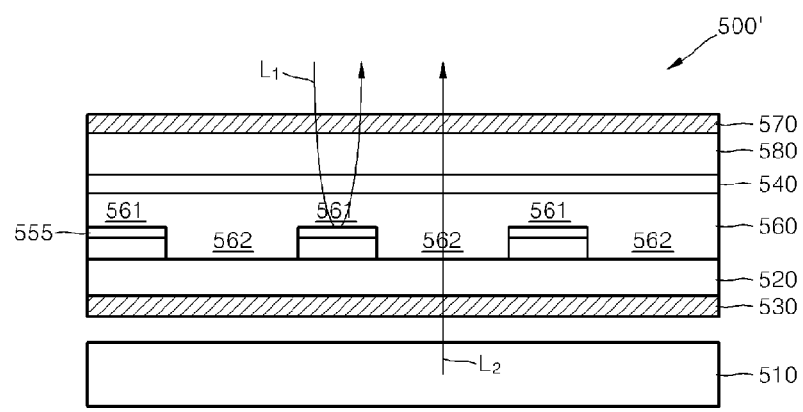
FIG. 8 is a schematic view illustrating a conventional transflective liquid crystal display device for comparing it with the transflective liquid crystal display device of FIG. 7.

In the case of the transflective liquid crystal display, the optical efficiency can be improved, especially in the case that the external light L1 is used. FIG. 8 is a schematic view illustrating a conventional transflective liquid crystal display device 500' for comparing it with the transflective liquid crystal display device 500 of FIG. 7. Referring to FIG. 8, a reflective plate 555 is formed on a reflective area 561, and a transmissive color filter 540 is formed on an upper substrate 580. The operation of the conventional transflective liquid crystal display 500' is the same as that of the transflective liquid crystal display 500 of FIG. 7 when the light L2 of a backlight 510 is used to form an image. However, when external light is used, since the external light passes the transmissive color filter 540 twice, light loss can occur. However, the transflective liquid crystal display device 500 of FIG. 7 minimizes the light loss by forming the reflective color filter 550 on the reflective area 561 and by forming the transmissive color filter 540 on a lower substrate 520.

In an exemplary method of adjusting a photonic bandgap of a photonic crystal according to the present invention, a photonic crystal is formed on a front surface of a substrate using colloid self-assembly method, and the photonic bandgap is variously adjusted according to an area by irradiating light. Accordingly, a photonic crystal having various photonic bandgaps can be easily formed without using a complicated method in which a complicated electrode pattern is formed on a substrate, or a substrate is immersed in a water solution to repeatedly grow various types of colloid particles. In addition, a reflective color filter having R, G, and B subpixels formed thereon can be easily manufactured using the methods.

In a reflective liquid crystal display device having the reflective color filter, a reflective color filter is disposed on the reflective area, and thus light loss is minimized in a mode where external light is used.

While a method of adjusting a photonic bandgap of a photonic crystal, a method of manufacturing a reflective color filter using the method of adjusting and a display device including the reflective color filter have been described, it will be understood by those of ordinary skill in the art that various changes in form and details may be made therein without departing from the spirit and scope of the present invention as defined by the following claims.

What is claimed is:

1. A method of adjusting a photonic bandgap of a photonic crystal, the method comprising:
   forming the photonic crystal having a photonic bandgap on a substrate; and
   changing the photonic bandgap by irradiating light onto the photonic crystal,
   wherein the forming comprises:
     growing spherical colloid particles on the substrate using a colloid self-assembly method;
     filling a space between the spherical colloid particles with a material having an effective refractive index which can be changed by light; and
     removing the spherical colloid particles.

2. The method of claim 1, wherein the changing comprises changing the photonic bandgap of a part of the photonic crystal, smaller than the whole, by irradiating light only onto the part of the photonic crystal using a mask having an opening corresponding to the part of the photonic crystal to be changed.

3. The method of claim 2, further comprising:
prior to forming the photonic crystal,
forming an insulating barrier rib at an interface between a first part and a second part of the photonic crystal.

4. The method of claim 1, wherein the changing comprises changing the photonic bandgap by adjusting the a dosage or an exposure time of the light, wherein the light is one of infrared light and visible light.

5. The method of claim 1, wherein the photonic crystal comprises one of a material in which phase-transition occurs due to heat, and a material in which nano pores are generated by heat.

6. The method of claim 5, wherein the changing comprises scanning light, comprising one of a laser beam and focused light, onto the photonic crystal and changing the photonic bandgap by adjusting one of an output and a scan time of the light.

7. A method of manufacturing a reflective color filter, the method comprising:
forming a photonic crystal having a first photonic bandgap corresponding to a first color on a transparent substrate, the photonic crystal having at least first, second, and third non-overlapping regions;
adjusting a photonic bandgap of the second region, to a second photonic bandgap corresponding to a second color by irradiating light to a second region using a mask which has an opening corresponding to the second region and which covers the first and third regions of the photonic crystal; and
adjusting a photonic bandgap of the third region, to a third photonic bandgap corresponding to a third color by irradiating light to the third region using a mask which has an opening corresponding to the third region,
wherein the photonic crystal comprises a material of which an effective refractive index is changed by light or heat.

8. The method of claim 7, wherein the first color is one of blue and red.

9. The method of claim 7, wherein the forming comprises growing spherical colloid particles on the substrate using a colloid self-assembly method.

10. The method of claim 7, wherein the forming comprises:
growing spherical colloid particles on the substrate using a colloid self-assembly method;
filling a space between the spherical colloid particles with a material having an effective refractive index which is changed by light; and
removing the spherical colloid particles.

11. The method of claim 7, further comprising:
prior to forming the photonic crystal,
forming insulating barrier ribs on the substrate at interfaces between the first, second, and third regions.

12. The method of claim 7, wherein adjusting the photonic bandgap of the second region comprises changing the photonic bandgap of the second region from the first photonic bandgap to the second photonic bandgap by adjusting a dosage or an exposure time of the light irradiated onto the second region, wherein the light is one of infrared rays and visible rays.

13. The method of claim 7, wherein adjusting the photonic bandgap of the third region comprises changing the photonic bandgap of the third region from the first photonic bandgap to the third photonic bandgap by adjusting a dosage or an exposure time of the light irradiated onto the second region, wherein the light is one of infrared rays and visible rays.

14. The method of claim 7, wherein the photonic crystal comprises one of a material in which a phase-transition occurs due to heat, and a material in which nano pores are generated by heat.

15. The method of claim 14, wherein adjusting the photonic bandgap of the second region comprises scanning a laser beam over the second region, and changing the photonic bandgap of the second region from the first photonic bandgap to the second photonic bandgap by adjusting a dosage or a scan time of the laser beam.

16. The method of claim 14, wherein adjusting the photonic bandgap of the third region comprises scanning a laser beam over the third region, and changing the photonic bandgap of the third region from the first photonic bandgap to the third photonic bandgap by adjusting a dosage or a scan time of the laser beam.

* * * * *